(12) United States Patent
Tota

(10) Patent No.: US 9,628,137 B2
(45) Date of Patent: Apr. 18, 2017

(54) WIRELESS COMMUNICATION DEVICE, WIRELESS COMMUNICATION METHOD, AND RECORDING MEDIUM

(71) Applicant: FUJITSU LIMITED, Kawasaki-shi, Kanagawa (JP)

(72) Inventor: Kazuyuki Tota, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/950,353

(22) Filed: Nov. 24, 2015

(65) Prior Publication Data

US 2016/0173166 A1   Jun. 16, 2016

(30) Foreign Application Priority Data

Dec. 11, 2014   (JP) .................. 2014-250935

(51) Int. Cl.
| | |
|---|---|
| *H04B 1/40* | (2015.01) |
| *H04B 1/50* | (2006.01) |
| *H04L 5/00* | (2006.01) |
| *H04L 27/00* | (2006.01) |
| *H01Q 5/335* | (2015.01) |
| *H01Q 1/24* | (2006.01) |
| *H01Q 21/30* | (2006.01) |

(52) U.S. Cl.
CPC ............. *H04B 1/50* (2013.01); *H01Q 5/335* (2015.01); *H04L 5/00* (2013.01); *H04L 27/00* (2013.01); *H01Q 1/243* (2013.01); *H01Q 21/30* (2013.01)

(58) Field of Classification Search
None
See application file for complete search history.

(56) References Cited

U.S. PATENT DOCUMENTS

| | | | |
|---|---|---|---|
| 5,717,368 A | 2/1998 | Niiranen | |
| 6,639,555 B1 | 10/2003 | Kane et al. | |
| 9,191,050 B1* | 11/2015 | Hwang | ........ H04B 1/525 |
| 2008/0212552 A1 | 9/2008 | Fukamachi et al. | |
| 2011/0255469 A1 | 10/2011 | Kishiyama et al. | |

FOREIGN PATENT DOCUMENTS

| | | |
|---|---|---|
| JP | 1-34442 Y2 | 10/1989 |
| JP | 7-170204 A | 7/1995 |
| JP | 2000-156607 A | 6/2000 |
| JP | 2002-118428 A | 4/2002 |
| JP | 2009-124746 A | 6/2009 |
| JP | 2010-74754 A | 4/2010 |

* cited by examiner

*Primary Examiner* — Mohammed Rachedine
(74) *Attorney, Agent, or Firm* — Westerman, Hattori, Daniels & Adrian, LLP

(57) ABSTRACT

A wireless communication device includes a first antenna from which a first signal is transmitted; a second antenna through which a second signal is received in a frequency band that is different from a frequency band of the first signal; a first signal removal circuit configured to remove a component of a frequency band of the second signal from the first signal when the first signal removal circuit is electrically coupled to the first antenna; and a processor configured to determine whether to electrically connect the first signal removal circuit to the first antenna, based on an output strength of the first signal that is transmitted from the first antenna, when the second signal is received through the second antenna.

15 Claims, 12 Drawing Sheets

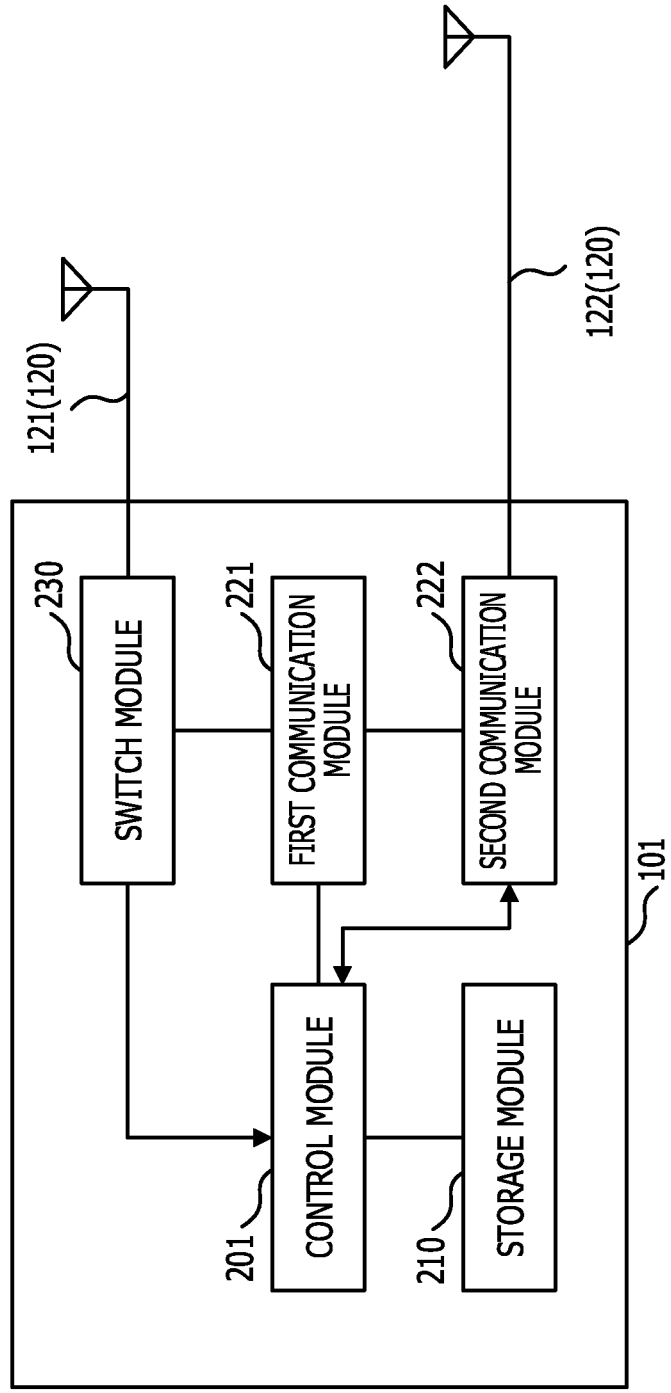

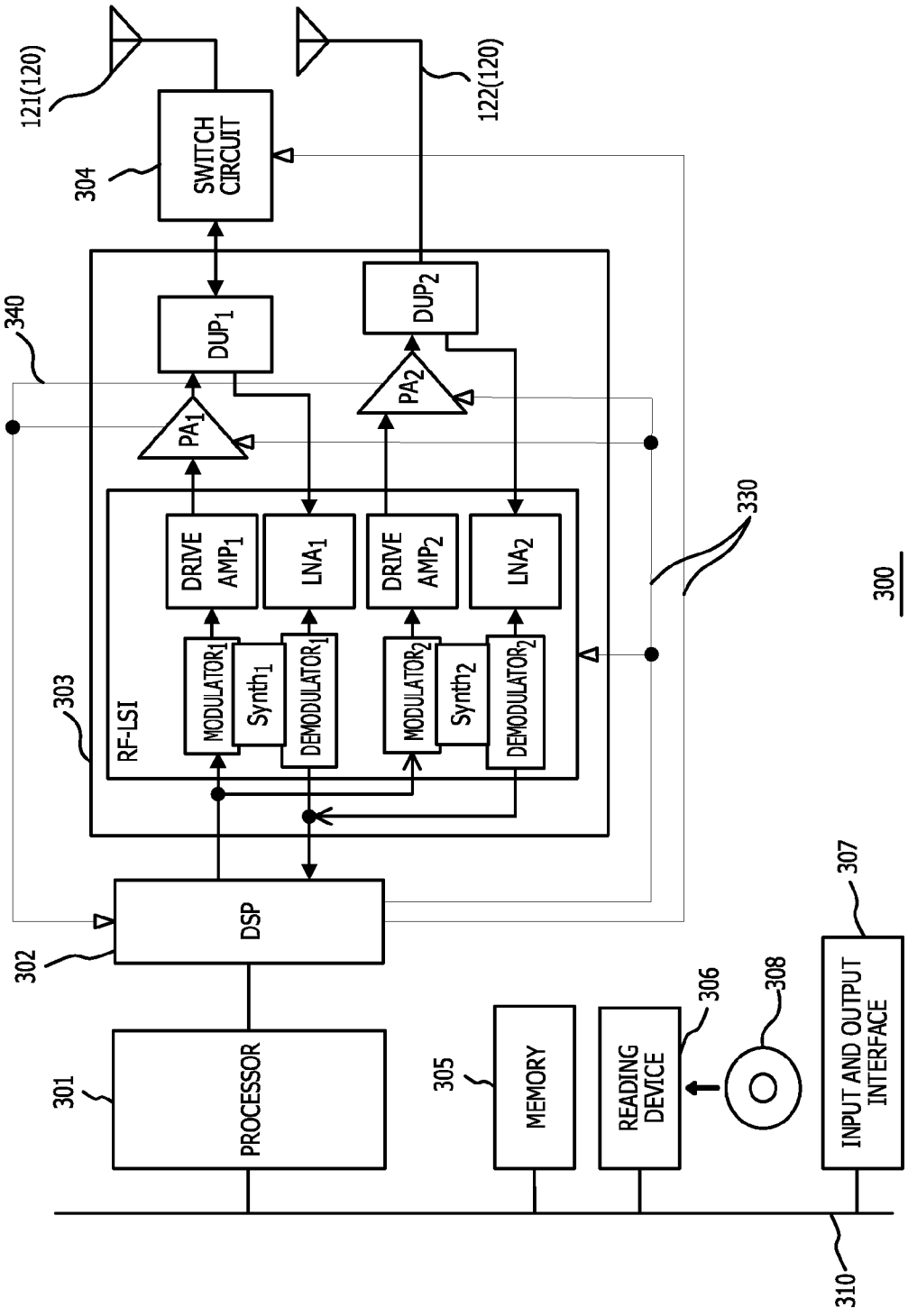

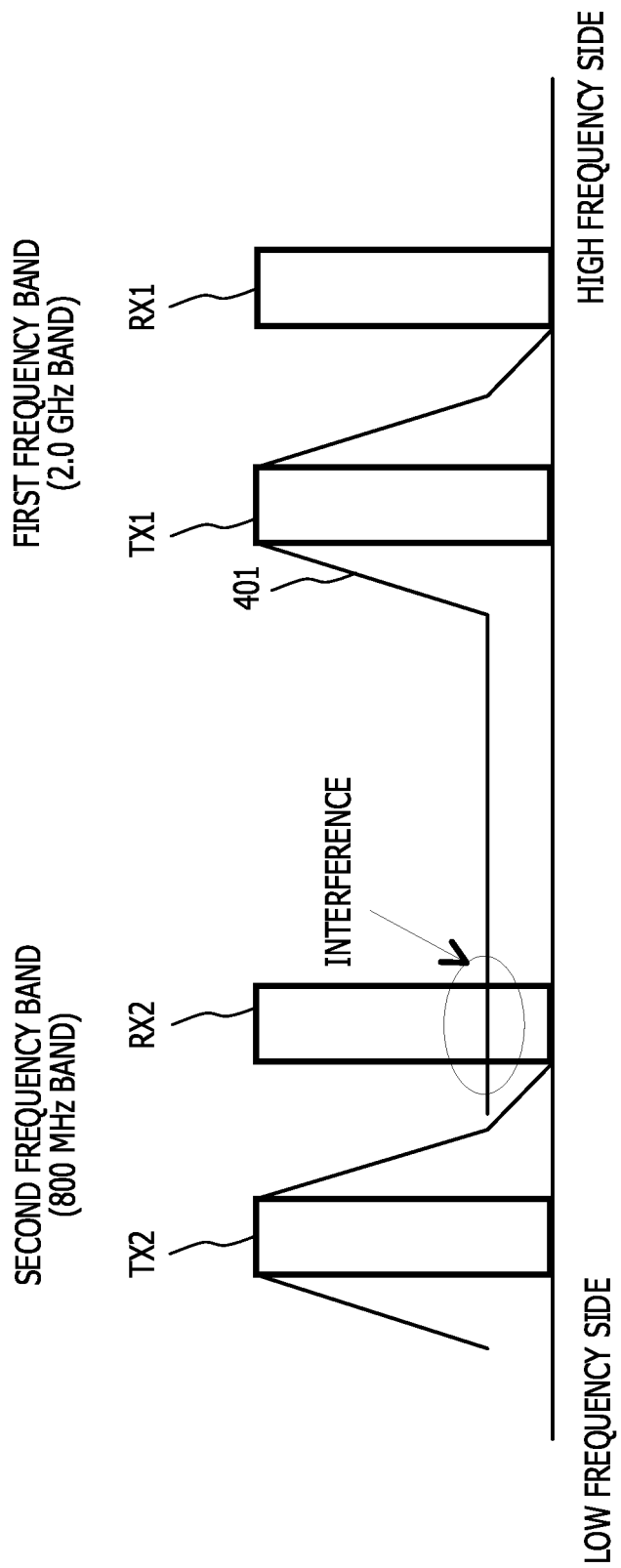

FIG. 7A

| OUTPUT STRENGTH OF TRANSMISSION SIGNAL | | CA IS NOT PRESENT | CA IS PRESENT |
|---|---|---|---|
| | EQUAL TO OR SMALLER THAN FIRST VALUE | OPEN | OPEN |
| | GREATER THAN FIRST VALUE | OPEN | CLOSE |

FIG. 7B

| OUTPUT STRENGTH OF TRANSMISSION SIGNAL | | C/N RATIO | |
|---|---|---|---|
| | | EQUAL TO OR SMALLER THAN SECOND VALUE | GREATER THAN SECOND VALUE |
| | GREATER THAN FIRST VALUE | CLOSE | OPEN |

WIRELESS COMMUNICATION DEVICE, WIRELESS COMMUNICATION METHOD, AND RECORDING MEDIUM

CROSS-REFERENCE TO RELATED APPLICATION

This application is based upon and claims the benefit of priority of the prior Japanese Patent Application No. 2014-250935, filed on Dec. 11, 2014, the entire contents of which are incorporated herein by reference.

FIELD

The embodiments discussed herein are related to a wireless communication device, a wireless communication method, and a recording medium.

BACKGROUND

Communication schemes such as Wideband Code Division Multiple Access (W-CDMA) are used as third generation mobile communication systems. In the W-CDMA scheme, for example, a transmission and reception frequency interval in a 2 GHz frequency band is fixed to 190 MHz. When a frequency in a downlink band in which a wireless communication device performs reception is determined, a frequency in an uplink band in which a terminal performs transmission is also determined accordingly. That is, in the W-CDMA scheme, communication is performed in which the frequency in the downlink band that is used and the frequency in the uplink band are stipulated in a one-to-one correspondence manner.

On the other hand, it is desirable that with a recent increase in the amount of information data that is communicated by a user, communication throughput is improved. As one solution of improving the communication throughput, it is considered that the wireless communication device is caused to perform communication in multiple frequency bands at the same time to secure a bandwidth for communication. As a technology of performing communication in multiple frequency bands at the same time, there is carrier aggregation. The carrier aggregation is hereinafter referred to as a CA. In the CA, for example, multiple component carriers, a bandwidth of each being 20 MHz, are integrated and thus communication is performed. Thus, a bandwidth that is as broad as 60 MHz is secured, and high-speed, high-capacity communication is realized.

In regard to this, technologies are known in which, when multiple mobile communication systems are present in a mixed manner, a mobile terminal device and a wireless base station device are provided that correspond to each of the multiple mobile communication systems (for example, Japanese Laid-open Patent Publication No. 2010-74754). On the other hand, technologies relating to the wireless communication device are disclosed in Japanese Laid-open Patent Publication No. 2002-118428, Japanese Laid-open Patent Publication No. 7-170204, Japanese Examined Utility Model Application Publication No. 1-034442, Japanese Laid-open Patent Publication No. 2009-124746, and Japanese Laid-open Patent Publication No. 2000-156607.

However, for example, in the case where the wireless communication device performs communication in multiple frequency bands at the same time, such as when the CS is performed, among multiple antennas that are included in the wireless communication device, a transmission wave from a certain antenna causes the frequency interference to occur in a reception band for communication through another antenna. For this reason, communication performance deteriorates in the wireless communication device that performs communication in multiple frequency bands at the same time.

SUMMARY

According to an aspect of the invention, a wireless communication device includes a first antenna from which a first signal is transmitted; a second antenna through which a second signal is received in a frequency band that is different from a frequency band of the first signal; a first signal removal circuit configured to remove a component of a frequency band of the second signal from the first signal when the first signal removal circuit is electrically coupled to the first antenna; and a processor configured to determine whether to electrically connect the first signal removal circuit to the first antenna, based on an output strength of the first signal that is transmitted from the first antenna, when the second signal is received through the second antenna.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating one example of a functional block configuration of a wireless communication device according to the first embodiment;

FIG. 3 is a diagram illustrating one example of a hardware configuration of a computer;

FIG. 4 is a diagram illustrating frequency interference between each of multiple antennas that are included in the wireless communication device;

FIGS. 7A and 7B are diagrams illustrating one example of a condition under which a signal removal circuit is coupled to the first antenna;

DESCRIPTION OF EMBODIMENTS

Figure 1:
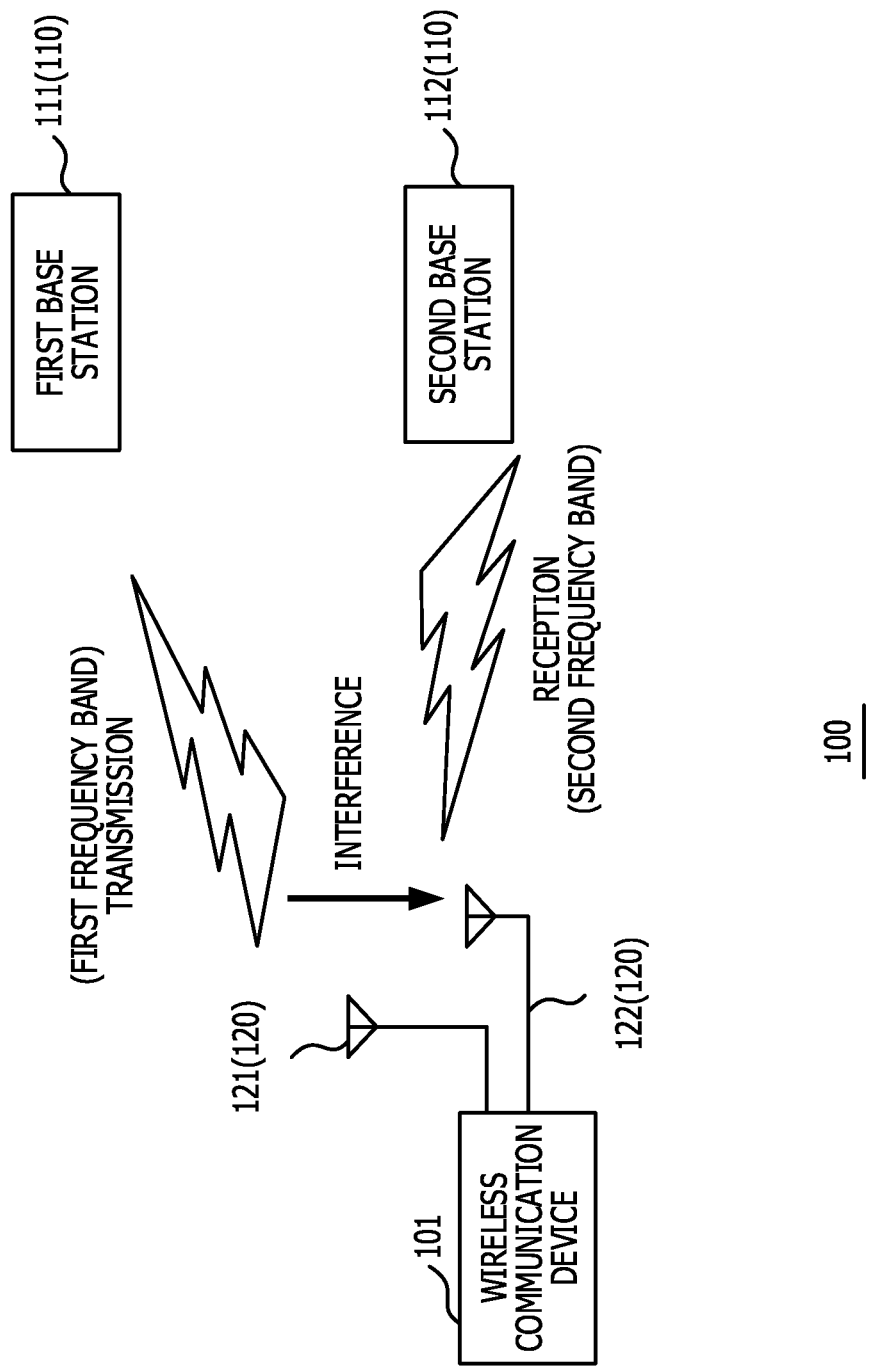
FIG. 1 is a diagram illustrating one example of a communication system according to a first embodiment.

Several embodiments will be described in detail below referring to the drawings. The same constituent elements in the multiple drawings are given the same reference numeral.

In a case where a wireless communication device independently performs communication in a certain frequency band without using multiple frequency bands in communication at the same time, frequency interference to other communications, which results from a spurious of a transmission signal of the wireless communication device, is frequency interference to communications that are performed by other wireless communication devices that are physically located at a distance. In this case, because an antenna through which communication is performed in a frequency band that causes the interference is physically located at a distance, a problem of the frequency interference does not occur.

However, in a case where the wireless communication device performs communication in multiple frequency bands at the same time, among multiple antennas that are included in the wireless communication device and that are physically located at a short distance, a spurious of a transmission wave from a certain antenna causes the frequency interference to occur in a reception band for communication through another antenna. Therefore, communication performance of the wireless communication device is reduced. For this reason, a technology that can improve the communication performance in the case where the wireless communication device performs communication in multiple frequency bands at the same time is desired.

Accordingly, the wireless communication device according to several embodiments includes a first antenna, a second antenna, and a signal removal circuit that is selectively connectable to the first antenna. In a case where the signal removal circuit is coupled to the first antenna, a component of a reception frequency band for communication through the second antenna is removed from a transmission signal from the first antenna. Then, for example, in a situation where reception quality of the second antenna is reduced due to a transmission wave from the first antenna, the wireless communication device connects the signal removal circuit to the first antenna. Accordingly, a component in the vicinity of a reception band in the second antenna, which is included in a spurious of the transmission signal from the first antenna, is removed by the signal removal circuit, and is not output from the first antenna. For this reason, the spurious of the transmission signal from the first antenna can be suppressed from interfering with the reception through the second antenna, and thus the communication performance can be improved.

A first embodiment will be described below. For example, a case where carrier aggregation (CA) is used, as an example of a situation in which the wireless communication device performs communication in multiple frequency bands at the same time, will be described below. However, the embodiment is not limited to this. For example, the embodiment can apply to a different situation in which the wireless communication device performs communication in multiple frequency bands at the same time, as well.

First Embodiment

FIG. 1 is a diagram illustrating one example of a communication system 100 according to the first embodiment. The communication system 100, for example, includes a wireless communication device 101 and a base station 110. The wireless communication device 101 is a device that has a wireless communication function, such as a smartphone, a portable telephone, a table terminal, or a notebook computer (a personal computer). The wireless communication device 101 includes multiple antennas 120 for performing wireless communication. For example, in FIG. 1, the wireless communication device 101 includes two antennas, that is, a first antenna 121 for performing communication in a first frequency band, and a second antenna 122 for performing communication in a second frequency band different from the first frequency band.

The base station 110, for example, is a device that establishes a network that is provided by a communications carrier. The communication system 100 in FIG. 1 includes the base stations 110, that is, a first base station 111 that performs communication in the first frequency band, and a second base station 112 that performs communication in the second frequency band that is different from the first frequency band. The first frequency band and the second frequency band are frequency bands, for example, such as a 2.0 GHz band, a 1.5 GHz band, an 800 MHz band, and the like. FIG. 1 individually illustrates the base station 110 that performs communication using different frequency bands. However, for example, one base station 110 may perform communication using multiple different frequency bands (for example, the first frequency band and the second frequency band). The wireless communication device 101, for example, is coupled to the base station 110 through the wireless communication, and transmits and receives data to and from the base station 110 through a network.

FIG. 2 is a diagram illustrating one example of a functional block configuration of the wireless communication device 101 according to the first embodiment. The wireless communication device 101, for example, includes a control module 201, a storage module 210, a first communication module 221, a second communication module 222, and a switch module 230. The control module 201, for example, is coupled to the storage module 210, the first communication module 221, the second communication module 222, and the switch module 230. The control module 201, for example, controls modules of the wireless communication device 101, which includes the storage module 210, the first communication module 221, the second communication module 222, and the switch module 230. The first communication module 221, for example, is coupled to the first antenna 121 through the switch module 230. The first communication module 221 processes a signal that is transmitted and received through the first antenna 121, according to an instruction of the control module 201. The second communication module 222, for example, is coupled to the second antenna 122. The second communication module 222 processes a signal that is transmitted and received through the second antenna 122, according to an instruction of the control module 201. The switch module 230, for example, connects the signal removal circuit that removes the component of the reception frequency band for the communication through the second antenna from the transmission signal from the first antenna, to the first antenna 121, according to an instruction of the control module 201. The storage module 210, for example, stores pieces of information, such as a first value and a second value, which will be described below. The pieces of information that are stored in these function modules and the storage module 210 will be described in more detail below.

FIG. 3 is a diagram illustrating one example of a hardware configuration of a computer 300 for realizing the wireless communication device 101. The computer 300, for example, includes a processor 301, a digital signal processor (DSP) 302, a high frequency circuit 303, a switch circuit 304, a memory 305, a reading device 306, an input and output interface 307, and the antenna 120.

The processor 301 controls each module of the wireless communication device 101. The processor 301 is coupled to the digital signal processor 302. The digital signal processor 302, for example, processes a baseband signal that is input and output between the digital signal processor 302 and the high frequency circuit 303, according to an instruction of the processor 301.

In an example in FIG. 3, the computer 300 includes two antennas 120, that is, the first antenna 121 and the second antenna 122. 2 sets of circuits that perform reception-system RF signal processing and transmission-system RF signal processing on each of the antennas 120 are included in the high frequency circuit 303. RF is short for radio frequency. In FIG. 3, among circuits that are included in the high frequency circuit 303, a subscript "1" is attached to a circuit that performs RF signal processing of the signal that is transmitted and received through the first antenna 121. The circuit to which the subscript "1" is attached, for example, serves as the first communication module 221. Among circuits that are included in the high frequency circuit 303, a subscript "2" is attached to a circuit that performs RF signal processing of the signal that is transmitted and received through the second antenna 122. The circuit to which the subscript "2" is attached, for example, serves as the second communication module 222. In a case where the two sets of circuits that are included in the high frequency circuit 303 are both referred to, description will be provided below without attaching the subscripts.

The high frequency circuit 303, for example, includes an RF-LSI, a power amplifier (PA), and a duplexer (DUP). LSI is short for large-scale integration. The RF-LIS, for example, includes a modulator, a demodulator, a synthesizer (Synth), a drive amplifier (DRIVE AMP), and a low noise amplifier (LNA).

Then, the high frequency circuit 303, for example, performs the RF signal processing as follows. The synthesizer generates a local generation signal. The modulator modulates the baseband signal that is input from the digital signal processor 302, using the local generation signal that is generated by the synthesizer. The baseband signal that is output by the digital signal processor 302, for example, is converted into an analog signal through a digital-to-analog converter, and is input into the modulator. The signal that is modulated by the modulator is amplified through the drive amplifier and the power amplifier. The drive amplifier is an upstream amplifier for transmission. The power amplifier is a downstream amplifier for transmission. The signal that is amplified in the power amplifier is output to the antenna 120 through the duplexer. For example, in a case where the antenna 120 is shared between a transmission system and a reception system, the duplexer separates a transmission path and a reception path electrically.

The signal that is received through the antenna 120 is input into the low noise amplifier through the duplexer. The low noise amplifier amplifies a signal component while reducing noise, and inputs the amplified signal into the demodulator. The demodulator demodulates the signal that is input, using the local generation signal that is generated by the synthesizer, and outputs the baseband signal to the digital signal processor 302. The baseband signal that is output from the demodulator, for example, is converted into a digital signal through an analog-to-digital converter, and is input into the digital signal processor 302.

In the example in FIG. 3, the switch circuit 304 is coupled to the first antenna, in a state of being located just below the first antenna 121, and an output from the duplexer $DUP_1$ is output to the first antenna 121 through the switch circuit 304. The signal that is received through the first antenna 121 is input into the duplexer $DUP_1$ through the switch circuit 304. The switch circuit 304, for example, is the switch module 230.

According to an instruction of the processor 301, the digital signal processor 302 outputs a control signal to the high frequency circuit 303 and the switch circuit 304 through a control line 330, and controls operation of each of the high frequency circuit 303 and the switch circuit 304. For example, the digital signal processor 302 outputs the control signal to the power amplifier, and controls amplification rate of the power amplifier. The digital signal processor 302 receives feedback of an output of the power amplifier through a feedback line 340, and for example, notifies the processor 301 of information on power, voltage, or the like of the signal, which is output from the power amplifier. The feedback of the output of the power amplifier, for example, is converted into a digital signal through the analog-to-digital converter, and is input into the digital signal processor 302.

The processor 301, the memory 305, the reading device 306, and the input and output interface 307, for example, are coupled to each other through a bus 310. Then, for example, a program in which a procedure for an operational flow that will be described below is recorded is executed using the memory 305, and thus the processor 301 functions as the control module 201.

The memory 305, for example, may be a semiconductor memory, and includes a RAM area and a ROM area. RAM is short for random access memory. ROM is short for read only memory. For example, the ROM area is a semiconductor memory such as a flash memory. The reading device 306 has access to a portable recording medium 308 according to an instruction of the processor 301. The portable recording medium 308, for example, is realized by a semiconductor device (a USB memory, an SD memory card, or the like), a medium (a magnetic disk or the like) that information is written to and read from using a magnetic action, a medium (a CD-ROM, a DVD, or the like) that information is written to and read from using an optical action, or the like. USB is short for Universal Serial Bus. CD is short for compact disc. DVD is short for digital versatile disc. The storage modules 210 described above, for example, include the memory 305, and the portable recording medium 308.

The input and output interface 307, for example, is an interface between an input device and an output device. The input device, for example, is a device such as an input key or a touch panel that receives an input from a user. The output device, for example, is a display device such as a display, or is a printing device such as a printer.

Programs according to the embodiment, which include the program that causes the processor 301 to execute the operational flow that will be described below, for example, are provided to the wireless communication device 101 in the following manner.

(1) The program is installed in advance in the memory 305.

(2) The program is recorded on the portable recording medium 308.

(3) The program is provided from a server such as a program server over the Internet.

The hardware configuration of the computer 300 is described referring to FIG. 3, but the embodiment is not limited to this. For example, according to another embodiment, some functions of or all functions of the control module 201 described above may be mounted, as hardware, into an FPGS, an SoC, or the like. FPGA is short for field programmable gate array. SoC is short for system-on-a-chip.

Subsequently, for example, in the case where the wireless communication device 101 performs communication in multiple frequency bands at the same time, such as in a case where communication is performed with the carrier aggregation, the frequency interference that occurs between each of the multiple antennas within the wireless communication device 101 is described. As illustrated in FIG. 1, for example, the wireless communication device 101 is assumed to receive data from the second base station 112 using the second frequency band through the second antenna 122 while transmitting data to the first base station 111 using the first frequency band through the first antenna 121. In this case, for example, a spurious of a transmission signal from the first antenna 121 is superimposed onto the reception band in the second antenna 122, and thus causes the frequency interference to occur. This causes a reduction in the communication performance.

FIG. 4 is a diagram that illustrates, for example, the frequency interference between each of the multiple antennas that are included in the wireless communication device 101 at a time of the carrier aggregation. In an example in FIG. 4, the wireless communication device 101 at the time of the carrier aggregation is assumed to perform communication through the first antenna 121 using a 2.0 GHz band as the first frequency band and to perform communication at the same time through the second antenna 122 using an 800 MHz band as the second frequency band. An uplink band (a TX band) and a downlink band (a RX band) are assumed to be set in a pair in each of the first frequency band and the second frequency band. For example, the first antenna 121 transmits a signal in the uplink band: TX1 of the first frequency band and receives a signal in the downlink band: RX1. In the same manner, the second antenna 122, for example, transmits a signal in the uplink band: TX2 of the second frequency band and receives a signal in the downlink band: RX2.

At this point, in the wireless communication device 101, processing that secures the reception quality in the downlink band (the RX band) that makes up the pair is often performed using an exclusive part (for example, a duplexer) that attenuates the spurious of the transmission signal from the antenna 120. For example, in FIG. 4, a low pass filter type circuit is provided to the transmission side of the duplexer that is coupled to the first antenna 121, and thus the sufficient attenuation of the transmission signal 401 that is output from the first antenna 121 in the downlink band: RX1 that is positioned further to the high frequency side than the uplink band: TX1 is achieved. However, in this case, the attenuation on the side that is positioned further to the low frequency side than the uplink band: TX1 is insufficient, and a spurious of the transmission signal 401 on the low frequency side is superimposed onto the downlink band: RX2 of the second frequency band for communication through the second antenna 122. For example, in such a case, because the second antenna 122 is another antenna that is included in the wireless communication device 101, and is physically located at a short distance, the frequency interference is caused to occur, and a reduction in communication quality is caused. For this reason, in the case where the wireless communication device 101 performs communication in multiple frequency bands at the same time, a technology that can reduce a spurious of an output signal on the transmission side and improve the communication performance of the wireless communication device 101 is desired. The antenna through which communication is performed in the frequency band in which the spurious of the transmission wave that is output from the antenna in this manner causes the frequency interference to occur in communication through another antenna which is included in the wireless communication device 101 is described below referred to as the first antenna 121. The antenna through which communication is performed in the frequency band in which the frequency interference occurs because the spurious of the transmission wave that is output from the first antenna is superimposed onto the reception band is referred to as the second antenna 122.

Here, the wireless communication device 101 according to the first embodiment includes the switch module 230 just below the first antenna 121. The switch module 230, for example, includes a signal removal circuit 500 that is selectively connectable to the first antenna 121 using a switch and the like. In a case where the signal removal circuit 500, for example, is coupled to the first antenna 121, a component of a reception frequency band for communication through the second antenna 122 is removed from a transmission signal from the first antenna 121.

Figure 5A:
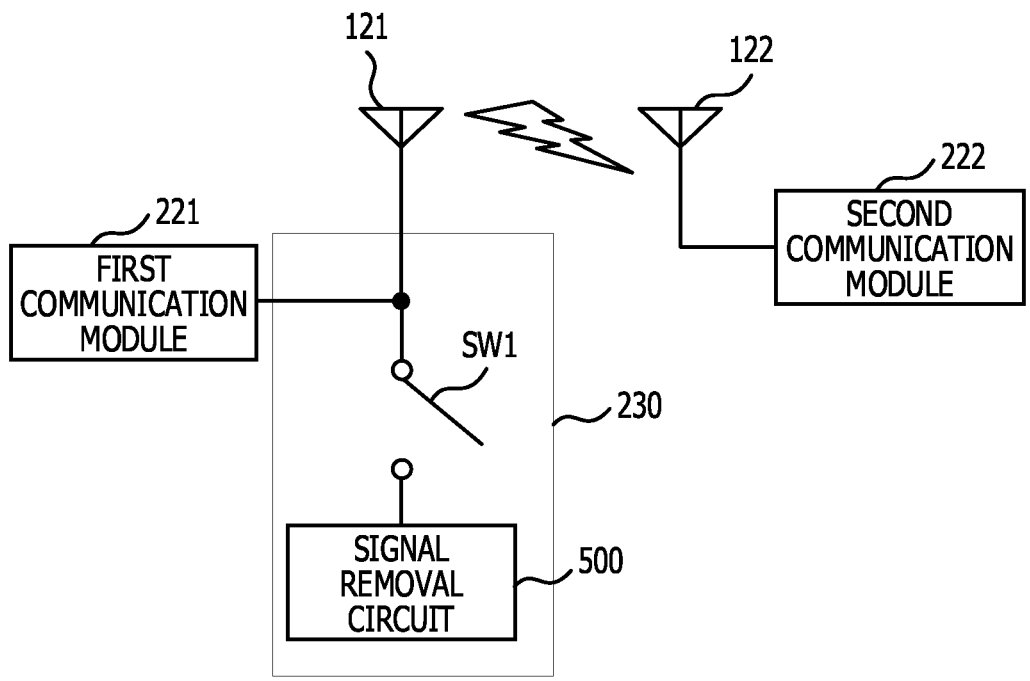
FIGS. 5A and 5B are diagrams illustrating one example of a switch module according to the first embodiment.
Figure 5B:
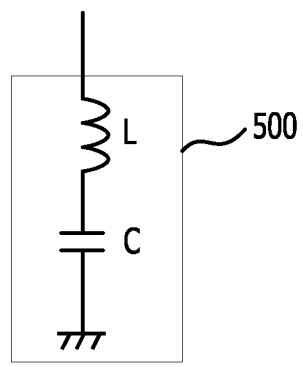

FIGS. 5A and 5B are diagrams illustrating one example of the switch module 230 according to the first embodiment. In an example in FIG. 5A, the switch module 230 includes a switch SW1 and the signal removal circuit 500, and the signal removal circuit 500 is selectively connectable to the first antenna 121 using the switch SW1.

FIG. 5B illustrates one example of the signal removal circuit 500 in FIG. 5A. The signal removal circuit 500, for example, is a series resonance circuit that is obtained by connecting a coil (L) and a capacitor (C) in series. In this case, inductance of the coil (L) and conductance of the capacitor (C) are changed, and thus a resonance frequency of the series resonance circuit can be changed. Then, the resonance frequency of the series resonance circuit, for example, is combined with a reception band RX2 of the second frequency band for communication through the second antenna 122 that is included in the wireless communication device 101. In this case, in the transmission signal that is output from the first antenna 121, a component that has a frequency in the vicinity of the reception band: RX2 of the second frequency band for communication has small impedance of the series resonance circuit. Therefore, in a case where the series resonance circuit is coupled to the first antenna 121, the component that has the frequency in the vicinity of the reception band RX2 flows to the ground through the series resonance circuit and is not output from the first antenna 121. For this reason, a spurious of the transmission signal from the first antenna 121 can be suppressed from interfering with the reception through the second antenna 122, and thus the communication performance can be improved. Like in the series resonance circuit described above, in the signal removal circuit 500, in the case where the signal removal circuit 500 is coupled to the first antenna 121, a circuit is used that removes the component of the reception frequency band for the communication through the second antenna 122 from the transmission signal from the first antenna 121.

Figure 6A:
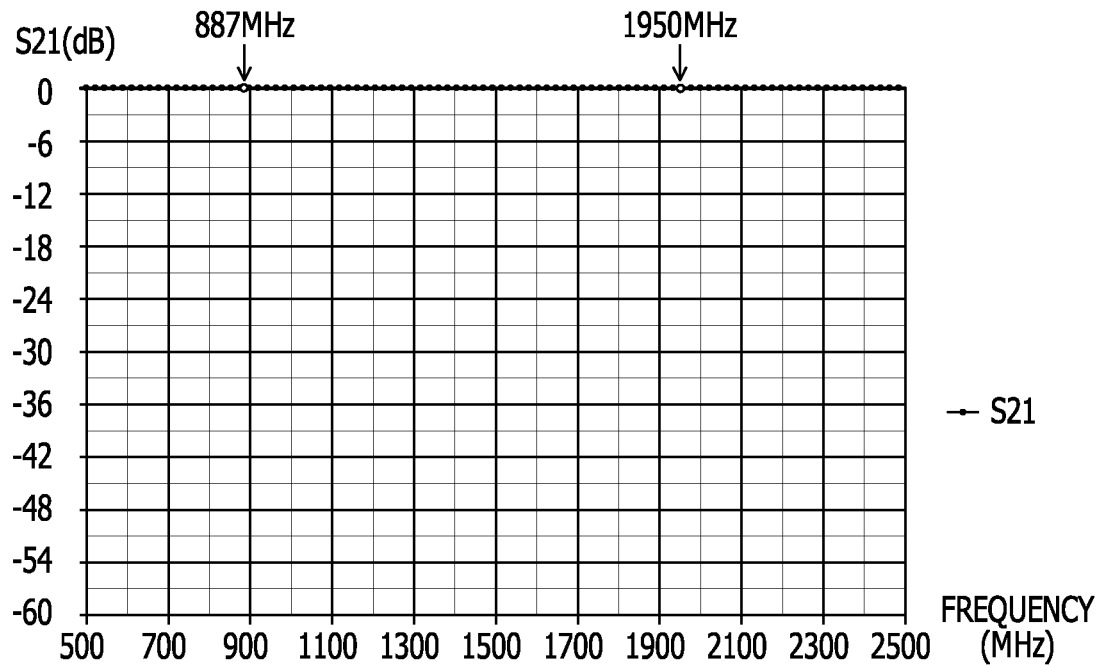
FIGS. 6A and 6B are diagrams illustrating one example of pass performance of an output signal from a first antenna.
Figure 6B:
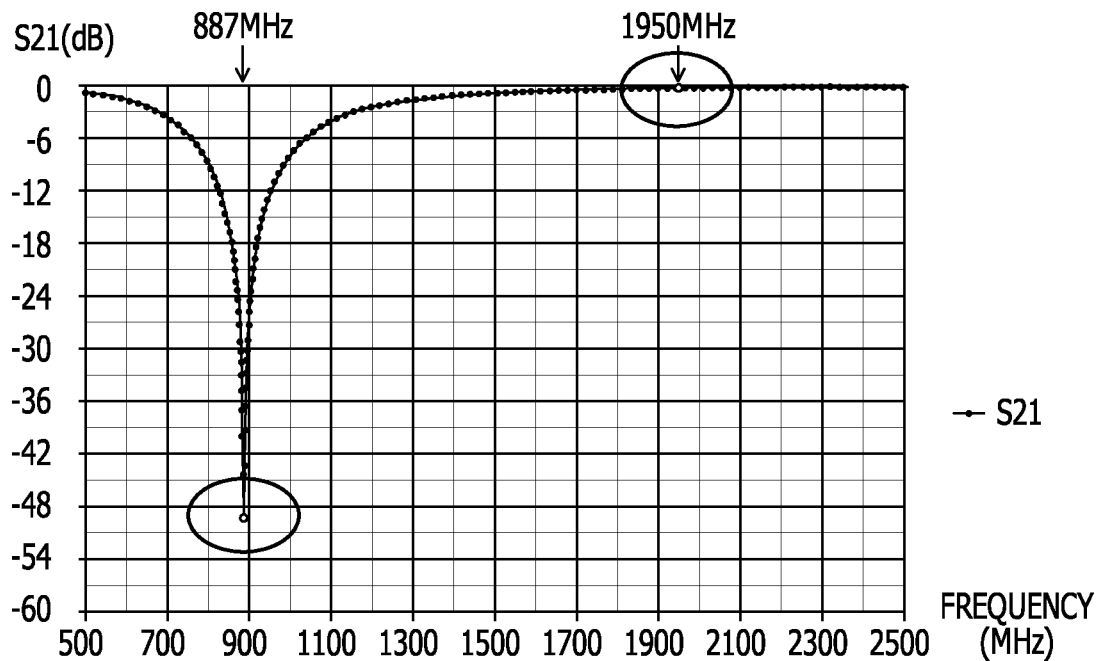

FIGS. 6A and 6B are diagrams illustrating one example of pass performance of the output signal from the first antenna 121 in a case where the series resonance circuit in FIG. 5B is used as the signal removal circuit 500. A vertical axis indicates the pass performance (an S parameter: S21) of the transmission signal that is input from the first communication module 221 to the first antenna 121, in terms of decibel (dB). A horizontal axis indicates a frequency of the transmission signal. FIG. 6A illustrates the pass performance in a case where the SW1 in FIG. 5A is opened, and that the pass performance over an entire frequency range that is illustrated is a value in the neighborhood of approximately 0 dB.

Therefore, the transmission signal from the first communication module 221 is output from the first antenna 121 without a loss.

FIG. 6B illustrates the pass performance (the S parameter: S21) of the transmission signal that is output from the first communication module 221 to the first antenna 121 in a case where the SW1 in FIG. 5A is closed and the series resonance circuit is coupled to the first antenna 121. As illustrated in FIG. 6B, the pass performance is a value in the neighborhood of approximately 0 dB in an uplink band: TX1 (here, 1950 MHz as an example) of the first frequency band, and the output signal from the first communication module 221 is output from the first antenna 121 without a loss. On the other hand, a signal is greatly attenuated in the vicinity of a downlink band: RX2 (here, 887 MHz as an example) of the second frequency band for communication, to which the resonance frequency of the series resonance circuit is allocated.

Therefore, the control module 201 closes the switch SW1 of the switch module 230 and thus connects the series resonance circuit to the first antenna 121, and thus can effectively remove a component that interferes with the downlink band of the second frequency band for communication, from the transmission signal from the first antenna 121. For this reason, the control module 201 can suppress the spurious of the transmission signal for communication in the first frequency band, which is output from the first antenna 121, from interfering with the reception in the second frequency band for communication through the second antenna 122. The control module 201 opens the switch SW1 of the switch module 230, and thus can output the transmission signal from the first antenna 121 without a loss.

Subsequently, control of timing at which the signal removal circuit 500 is coupled to the first antenna 121, which is performed by the control module 201 of the wireless communication device 101 according to the first embodiment, is described. FIGS. 7A and 7B are diagrams illustrating one example of a condition under which the control module 201 according to the first embodiment connects the signal removal circuit 500 to the first antenna 121.

FIG. 7A is a diagram for describing control for the connection of the signal removal circuit 500 to the first antenna 121, which is based on whether or not the carrier aggregation is performed and on the output strength of the transmission signal that is output from the first antenna 121. As described above, in the case where communication is independently performed in a certain frequency band without using multiple frequency bands in communication at the same time, the frequency interference to other communications, which results from the spurious of the transmission signal of the wireless communication device 101, is the frequency interference to communications that are performed by other wireless communication devices that are physically located at a distance. In this case, because the antenna through which communication is performed in the frequency band that causes the interference is physically located at a distance, a problem of the frequency interference does not occur. Moreover, when the signal removal circuit 500 is coupled to the first antenna 121, some loss occurs to the transmission signal. For this reason, in a case where the carrier aggregation is not used for communication, (no CA in FIG. 7A), the control module 201 of the wireless communication device 101 may open the SW1 and thus may not connect the signal removal circuit 500 to the first antenna 121.

For example, the more the amplification rate of the transmission signal is increased by the power amplifier that is included in the first communication module 221, the higher the level of the spurious of the transmission signal from the first antenna 121 tends to be. Therefore, the amplification rate of the transmission signal that is output from the first antenna 121 can be reduced, and thus the level of the spurious of the transmission signal in the reception band for the communication through the second antenna 122 can be reduced to within a range in which satisfactory communication through the second antenna 122 is possible. For this reason, the control module 201 connects the signal removal circuit 500 to the first antenna 121, based on the amplification rate of the transmission signal. For example, in a case where the amplification rate of the transmission signal is high, the output strength of the transmission signal is also increased, and in a case where the amplification rate of the transmission signal is low, the output strength of the transmission signal is also decreased. For this reason, the control module 201 may make a determination of whether the signal removal circuit 500 is coupled to the first antenna 121, using the output strength (for example, a power) of the transmission signal. That is, when power of the transmission signal that is amplified in the first communication module 221 is greater than a first value (is greater than the first value in FIG. 7A), the control module 201 may close the SW1 and may connect the signal removal circuit 500 to the first antenna 121. If the power of the transmission signal that is amplified in the first communication module 221 is equal to or smaller than the first value (is equal to or smaller than the first value in FIG. 7A), the control module 201 may open the SW1 and may not connect the signal removal circuit 500 to the first antenna 121. The first value is set to be a value with which it can be determined that if the power of the transmission signal is equal to or smaller than the first value, the frequency interference with the communication through the second antenna 122, which originates from the transmission signal falls within a permissible range for communication. According to one embodiment, the first value, for example, is 10 dBm. The first value may be set to a value indicating an output strength of the transmission signal other than the power. For example, the first value may be set with respect to a voltage of the transmission signal.

FIG. 7B is a diagram for describing the control of the connection of the signal removal circuit 500 to the first antenna 121, which is based on a carrier-to-noise ratio (a C/N ratio) of a reception signal in the second frequency band, which is received through the second antenna 122. For example, although the power of the transmission signal that is amplified in the first communication module 221 is greater than the first value, in some cases, the C/N ratio of the reception signal in the second frequency band, which is received through the second antenna 122, can be secured to the extent to which the C/N ratio is sufficient for communication. In this case, although the signal removal circuit 500 is not coupled to the first antenna 121, it is possible for the control module 201 of the wireless communication device 101 to satisfactorily perform communication in the second frequency band. For this reason, according to the first embodiment, in a case where the power of the transmission signal that is amplified in the first communication module 221 is greater than the first value, the control module 201 monitors the C/N ratio of the reception signal that is received through the second antenna 122. Then, when the C/N ratio of the reception signal that is received through the second antenna 122 is greater than a second value, the control module 201, for example, opens the SW1 as illustrated in FIG. 7B. At this point, the second value, for example, is set to a value with which it can be determined that when the carrier-to-noise ratio of the signal that is received through the second antenna is greater than the second value, this is not an obstacle to the communication through the second antenna 122. The second value, for example, is set according to a modulation scheme or a coding rate. According to one embodiment, the second value is a value ranging from 20 dB to 30 dB.

As illustrated above, the control module 201, for example, controls the connection of the signal removal circuit 500 to the first antenna 121, based on whether or not the CA is performed, the output strength of the transmission signal from the first antenna 121, the C/N ratio of the signal that is received through the second antenna 122, and the like.

Figure 8:
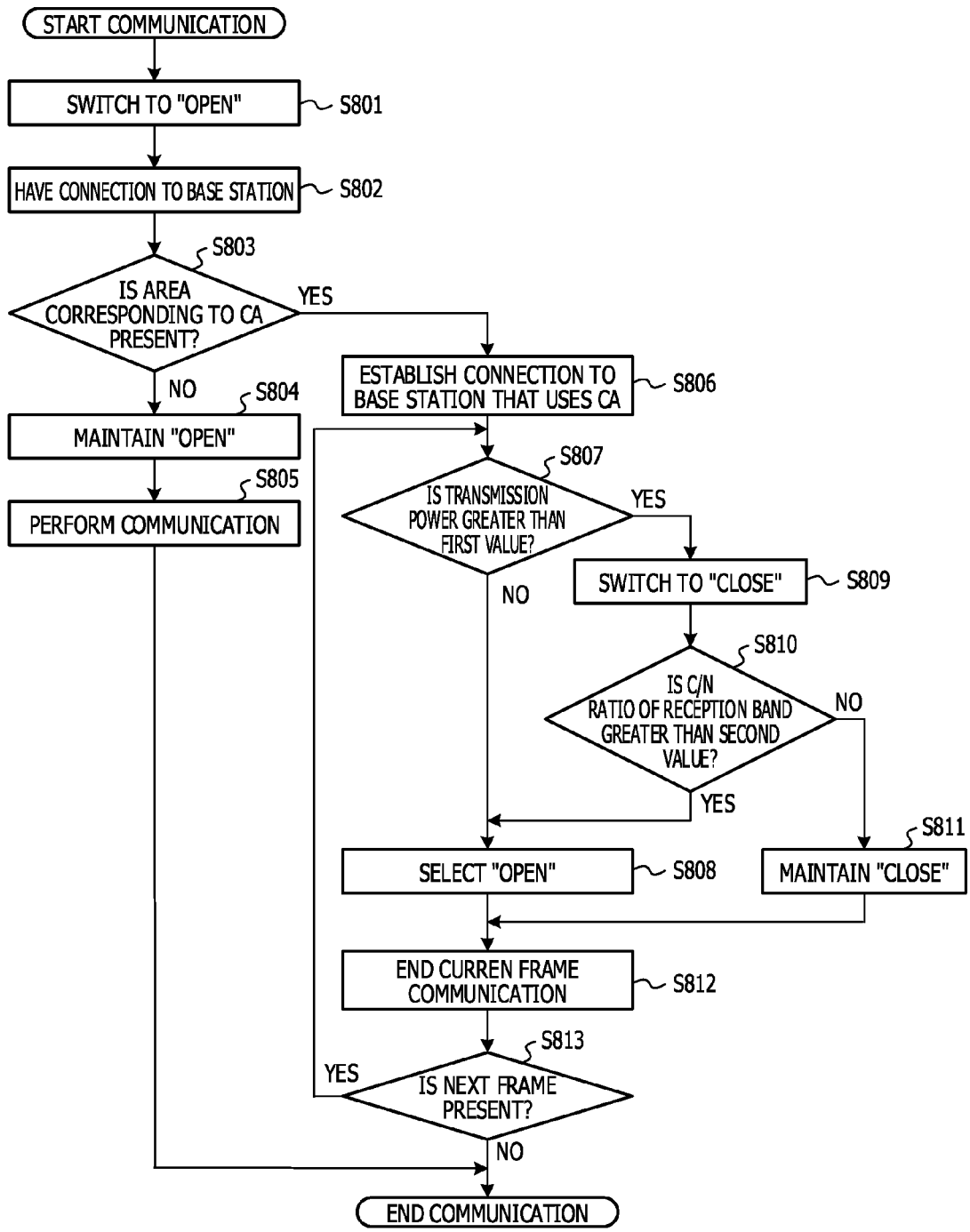
FIG. 8 is a flowchart illustrating one example of processing that controls the switch module according to the first embodiment.

FIG. 8 is a flowchart illustrating one example of processing that controls the switch module 230 according to the first embodiment, which is performed by the control module 201 of the wireless communication device 101. According to one embodiment, when a communication starting instruction is input into the control module 201, the control module 201 starts to perform the process that controls the switch module 230 that is illustrated in FIG. 8.

First, the control module 201 of the wireless communication device 101 switches the SW1 to OPEN and causes the SW1 to be in an initial state (S801). In a case where the SW1 is already switched to OPEN, the control module 201 maintains a state in which the SW1 is opened. In S802, the control module 201 establishes a connection to the base station 110 (S802). At this point, as one example, the control module 201 is assumed to connect to the first base station 111 through the first antenna 121, using the first frequency band. Subsequently, the control module 201 determines whether or not a communication area in which the wireless communication device 101 is present is an area that corresponds to the carrier aggregation (CA) (S803). For example, based on information that is received from the first base station 111, a connection to which is established, the control module 201 determines whether or not the communication area in which the wireless communication device 101 is present is the area that corresponds to the CA. In a case where it is determined that the communication area in which the wireless communication device 101 is present is not the area that corresponds to the CA (No in S803), the control module 201 maintains the state where the switch SW1 is opened (S804). Subsequently, the control module 201 performs communication with the first base station 111, the connection to which is established in S802, in the first frequency band, using the first antenna 121 (S805). When the transmission and reception of data is finished, the present operational flow is ended.

On the other hand, in a case where it is determined in S803 that the communication area in which the wireless communication device 101 is present is the area that corresponds to the CA (Yes in S803), the control module 201 has a connection to the base station 110 that performs communication using the carrier aggregation, at the same time that the communication with the first base station 111, the communication with which is established in S802, is performed in the first frequency band (S806). For example, according to an instruction from the first base station 111, the connection to which is established in S802, the control module 201 specifies the base station 110 that, at the same time, performs communication using the CA and establishes a connection to the base station 110. Here, as an example, the control module 201 is assumed to establish a connection to the second base station 112 through the second antenna 122, using the second frequency band. In this case, the control module 201, for example, performs processing that is different from that in the present operational flow, and thus performs communication with the second base station 112, the connection to which is established, using the carrier aggregation. For example, the control module 201 receives data from the second base station 112 through the second antenna 122.

Subsequent to S806, the control module 201 sets the power of the transmission signal in communication with the first base station 111, the connection to which is established in S802, through the first antennas 121. Then, the control module 201 determines whether or not the power of the transmission signal that is set is greater than the first value (S807). Based on signal strength of the signal that is received from the wireless communication device 101, the first base station 111, for example, transmits an instruction to designate a transmission power to the wireless communication device 101. According to the instruction to designate the transmission power from the first base station 111, the connection to which is established, the control module 201 of the wireless communication device 101, for example, sets the amplification rate of the transmission signal using the power amplifier that is included in the first communication module 221. Then, in S807, the control module 201 performs the determination of whether or not the power of the transmission that is generated at the amplification rate of the power amplifier that is set is greater than the first value. For example, the first value, as described referring to FIG. 7A, is set to be a value with which it can be determined that if the power of the transmission signal is equal to or smaller than the first value, the frequency interference with the communication through the second antenna 122, which originates from the transmission signal falls within the permissible range for communication. The control module 201, for example, acquires the power of the transmission signal that is output from the power amplifier, using the digital signal processor 302 that receives feedback from the power amplifier which is included in the high frequency circuit 303, and performs the determination in S807.

According to another embodiment, as power modes of the transmission signal, a high power mode and a low power mode are set to be in the wireless communication device 101. At this point, in the high power mode, the amplification rate of the power amplifier is set in such a manner that the power of the transmission signal is greater than the first value. In the low power mode, the amplification rate of the power amplifier is set in such a manner that the power of the transmission signal is equal to or smaller than the first value. Then, in this case, according to the instruction to designate the transmission power from the first base station 111, the connection to which is established, the control module 201 selects the power mode of the power amplifier that is included in the first communication module 221. Moreover, if the selected power mode is the high power mode, the control module 201 determines Yes in S807. If the selected power mode is the low power mode, the control module 201 determines No in S807.

In a case where it is determined in S807 that the output of the transmission signal from the power amplifier is equal to or smaller than the first value (No in S807), the control module 201 switches the switch SW1 to OPEN (S808). In S808, in a case where the switch SW1 is already switched to OPEN, the control module 201 maintains a state in which the switch SW1 is opened. On the other hand, in a case where it is determined in S807 that the output from the power amplifier is greater than the first value (Yes in S807), the control module 201 switches the switch SW1 of the switch module 230 to CLOSE, and connects the signal removal circuit 500 to the first antenna 121 (S809). In S809, in a case where the switch SW1 is already switched to CLOSE, the control module 201 maintains a state in which the switch SW1 is closed.

Subsequently, the control module 201 receives the signal in the band in which the spurious of the transmission wave from the first antenna 121 causes the interference term, and monitors the carrier-to-noise ratio of the reception signal for the communication through the second antenna 122. Then, the control module 201 determines whether or not the acquired carrier-to-noise ratio is greater than the second value (S810). The second value, as described referring to FIG. 7, is set in such a manner that if the carrier-to-noise ratio of the signal that is received through the second antenna is greater than the second value, the signal whose quality is not an obstacle to communication can be received. The control module 201, for example, acquires information on the carrier-to-noise ratio of the reception signal for the communication through the second antenna 122 from the digital signal processor 302, and performs the determination in S809. Based on the baseband signal that is input from the high frequency circuit 303, the digital signal processor 302 notifies the control module 201 of the information on the carrier-to-noise ratio of the reception signal for the communication through the second antenna 122.

In a case where it is determined in S810 that the carrier-to-noise ratio of the reception signal through the second antenna 122 is greater than the second value (Yes in S810), the control module 201 switches the switch SW1 to OPEN (S808). In a case where it is determined in S810 that the carrier-to-noise ratio of the reception signal through the second antenna is equal to or smaller than the second value (No in S810), the control module 201 maintains a state where the switch SW1 is closed (S811). That is, a state where the signal removal circuit 500 is coupled to the first antenna 121 is maintained. For this reason, a frequency component in the vicinity of the reception frequency band in the second antenna 122, which is included in the transmission signal from the first antenna 121, is removed by the signal removal circuit 500. Therefore, the spurious of the transmission signal from the first antenna 121 can be suppressed from interfering with the communication through the second antenna 122, and for example, an improvement in the carrier-to-noise ratio of the reception signal through the second antenna 122 can be expected.

Subsequently, the control module 201 performs communication until the transmission and reception of data in a frame that is currently allocated to the communication with the first base station 111 that uses the first antenna 121 is finished (S812). Subsequently, the control module 201 determines whether the next frame is present (S813). In a case where it is determined that the next frame is present (Yes in S813), the flow returns to S807. On the other hand, in a case where it is determined that the next frame is not present (No in S813), the control module 201 ends the present operational flow by ending the communication.

As described above, in a case where the wireless communication device 101 performs communication in multiple frequency bands at the same time, such as when the CA is performed, the control module 201 according to the first embodiment, for example, determines whether or not the output of the signal that is transmitted from the first antenna 121 is greater than the first value. At this point, in a case where the output of the transmission signal from the first antenna 121 is greater than the first value, there is a concern that the spurious of the transmission signal will interfere with the reception through the second antenna 122 that is included in the wireless communication device 101 and thus decrease the C/N ratio of the reception signal. For this reason, in a case where a transmission output of the first antenna 121 is greater than the first value, the control module 201 connects the signal removal circuit 500 to the first antenna 121. As described above, by connecting the signal removal circuit 500, the frequency component of the reception frequency band for the communication through the second antenna 122 is removed from the transmission signal from the first antenna 121. For this reason, the spurious of the transmission signal from the first antenna 121 can be suppressed from interfering with the communication through the second antenna 122. For example, the improvement in the carrier-to-noise ratio of the reception signal through the second antenna 122 can be expected. The control module 201 monitors the carrier-to-noise ratio of the reception signal through the second antenna 122. Then, the control module 201 determines whether or not the carrier-to-noise ratio of the reception signal through the second antenna 122 is greater than the second value. At this point, if the carrier-to-noise ratio of the reception signal through the second antenna is greater than the second value, communication can be performed without causing an obstacle in the second antenna 122. For this reason, if the carrier-to-noise ratio of the reception signal through the second antenna 122 is greater than the second value, the control module 201 switches the switch SW1 to OPEN, and releases the connection of the signal removal circuit 500 to the first antenna 121.

Therefore, according to the first embodiment, in a case where the wireless communication device 101 performs communication in multiple frequency bands using multiple antennas at the same time, the transmission output of the first antenna 121 can be suppressed from interfering with the reception through the second antenna 122. For this reason, according to the first embodiment, the communication performance of the wireless communication device 101 that performs communication in multiple frequency bands at the same time can be improved.

For example, as a technique that suppresses the transmission wave of the first antenna 121 from interfering with the reception through the second antenna 122, it is considered that a duplexer that is to be included in the first communication module 221 is designed in such a manner that the transmission signal in the reception band in the second antenna 122 is attenuated. However, in this case, for example, addition of a new circuit to the duplexer entails demerits, such as an increase in loss of the transmission signal due to the addition of the new circuit, and increases in the number of components, the size of a component, and costs. On the other hand, according to the first embodiment, for example, it is possible to selectively connect the signal removal circuit 500 using the switch SW1. Then, in a case where the output of the signal that is transmitted from the first antenna 121 is equal to or smaller than the first value (No in S807), the wireless communication device 101 does not connect the signal removal circuit 500 to the first antenna 121. For this reason, for example, the output of the signal that is transmitted from the first antenna 121 can be suppressed from being weak, the connection of the signal removal circuit 500 can be suppressed from being established in a situation where the frequency interference of the transmission signal with the communication through the second antenna 122 falls within the permissible range, and thus the loss of the transmission signal can be suppressed.

According to the first embodiment, if the carrier-to-noise ratio of the reception signal through the second antenna 122 is greater than the second value (Yes in S810), the wireless communication device 101 does not connect the signal removal circuit 500 to the first antenna 121. That is, for example, although the output of the transmission signal from the first antenna 121 is strong, in a case where the C/N ratio of the reception signal through the second antenna 122 can be secured to be sufficient for communication, the signal removal circuit 500 is not coupled to the first antenna 121. For this reason, a wasteful loss of the transmission signal due to the connection of the signal removal circuit 500 can be reduced.

Moreover, in a case where as the signal removal circuit 500, for example, the series resonance circuit is used in the manner that is illustrated in FIG. 5B, for example, an embodiment can be implemented using a simple circuit that is obtained by connecting the coil (L) and the capacitor (C) in series. For this reason, for example, the number of components, the size of a component, and costs can be suppressed from being increased, when compared with a case where a duplexer is improved. For example, in a case where the series resonance circuit is used, the switch SW1 is opened, and thus not only the loss of the transmission signal due to the signal removal circuit 500, but also the loss of the transmission signal due to the addition of the switch SW1 can be reduced. For this reason, the wireless communication device 101 can transmit a signal more efficiently.

Figure 9:
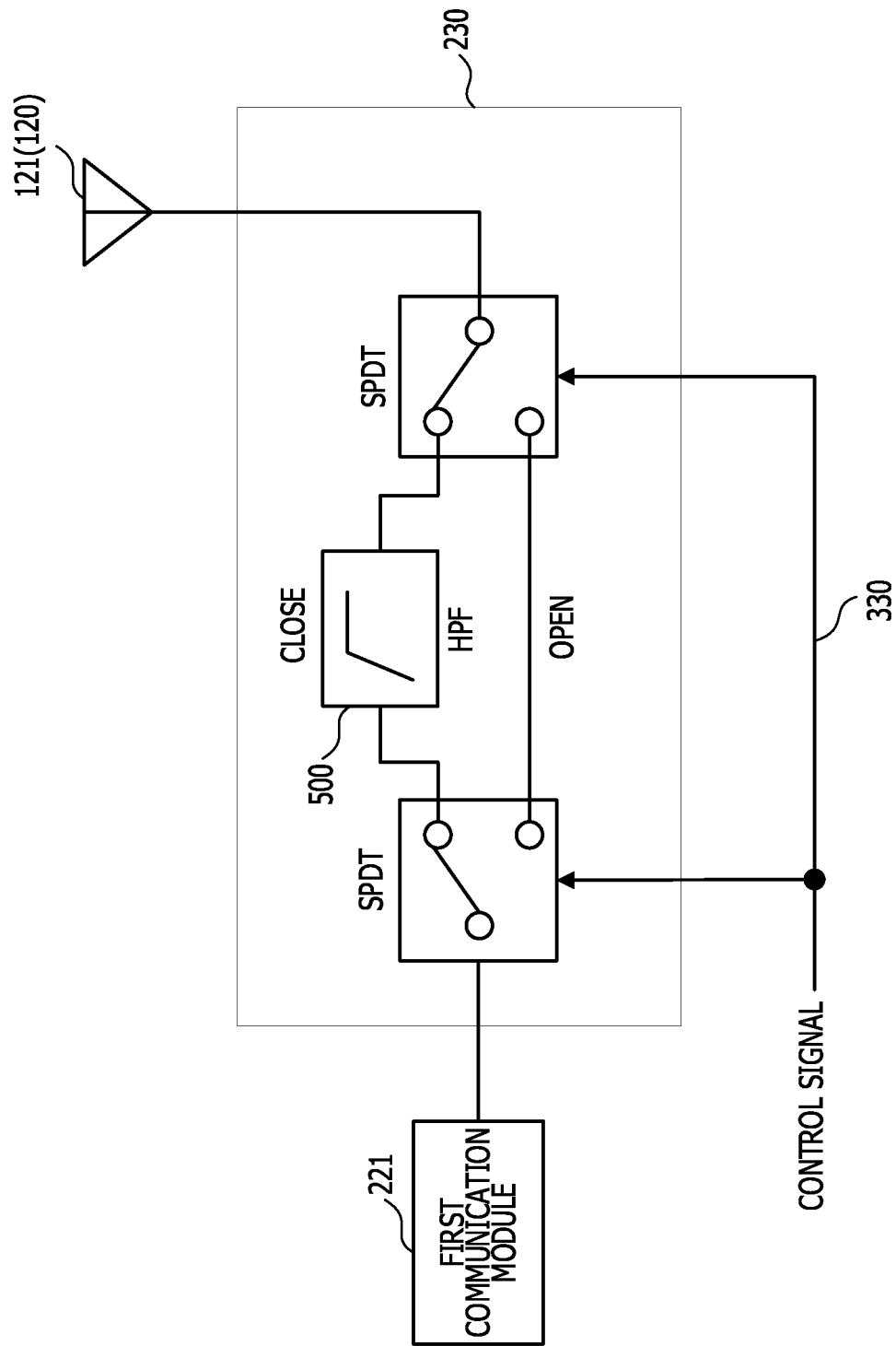
FIG. 9 is a diagram illustrating one example of a switch module according to a modification example of the first embodiment.

On the other hand, according to the embodiment, the signal removal circuit 500 that is available is not limited to the series resonance circuit. For example, a filter circuit that allows a specific frequency component to pass through, or another circuit may be used. FIG. 9 is a diagram illustrating one example of the switch module 230 according to a modification example of the first embodiment. In an example in FIG. 9, the switch module 230 includes two single pole double throw (SPDT) switches as the switch SW1 described above, and includes a high pass filter (HPF) as the signal removal circuit 500. Then, the high pass filter is selectively connectable to the first antenna 121 using the SPDT. The high pass filter, for example, is designed in such a manner that the signal on the high frequency side that includes the uplink band: TX1 in the first antenna 121 in FIG. 4 is allowed to pass through, but the signal on the low frequency side that includes the downlink band: RX2 in the second antenna 122 is removed. Then, the control module 201, for example, inputs a control signal into two SPDTs through the control line 330 in S809. Then, the control module 201 switches the connection to CLOSE, and thus connects the high pass filter to the first antenna 121. The control module 201, for example, inputs the control signal into two SPDTs through the control line 330 in S801 and S808. Then, the control module 201 switches the connection to OPEN, and thus releases the connection of the high pass filter to the first antenna 121. For example, as described above, in the case where the signal removal circuit 500 is coupled to the first antenna 121, various circuits are used in which the component of the reception frequency band for the communication through the second antenna 122 is removable from the transmission signal from the first antenna 121.

Second Embodiment

According to a second embodiment, the wireless communication device 101 has a function of performing communication in three or more frequency bands. According to the second embodiment, an example is described in which the frequency interference between antennas is reduced in a case where communication is performed using multiple frequency bands among the three or more frequency bands, at the same time.

Figure 10:
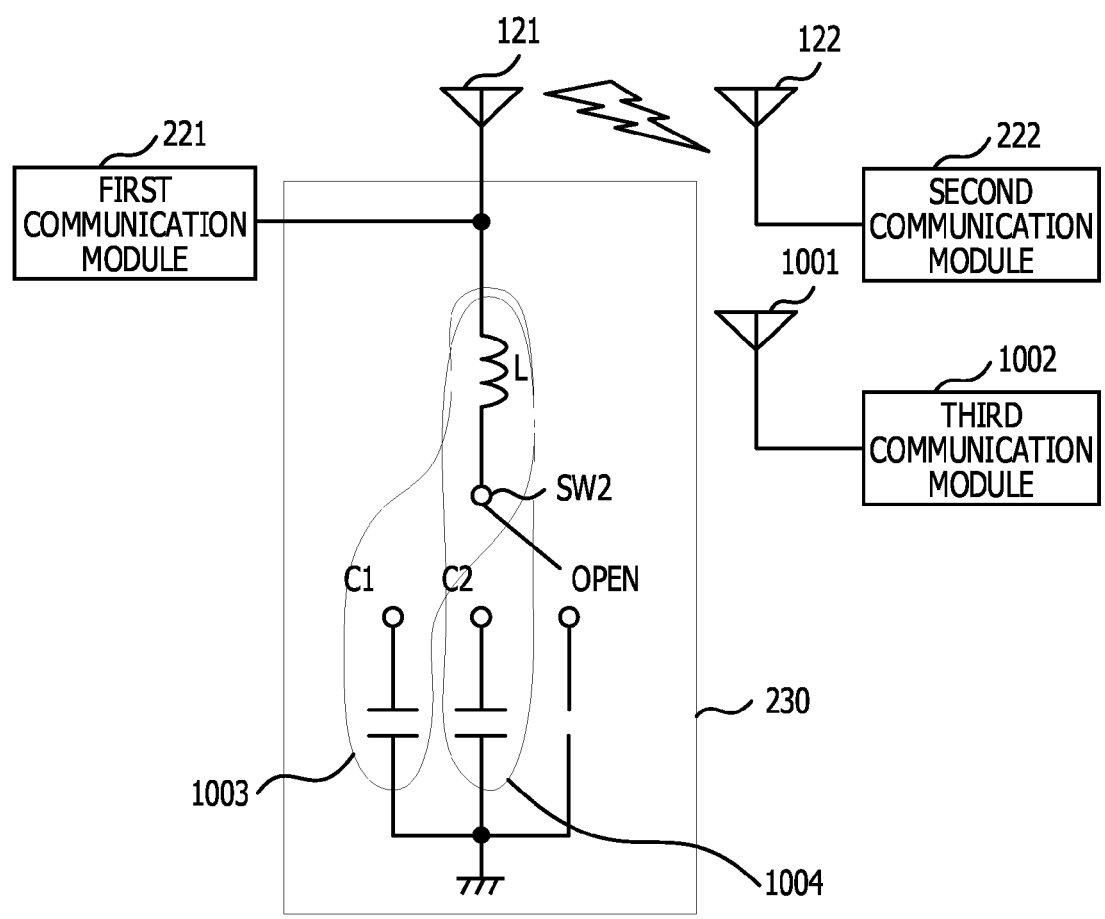
FIG. 10 is a diagram illustrating one example of a switch module according to a second embodiment.

FIG. 10 is a diagram illustrating one example of the switch module 230 according to the second embodiment, which is included in the first antenna 121 of the wireless communication device 101. In FIG. 10, the first antenna 121, for example, is an antenna through which communication with the first base station 111 is performed in the first frequency band (for example, a 2.0 GHz band). The second antenna 122, for example, is an antenna through which communication with the second base station 112 is performed in the second frequency band (for example, an 800 MHz band). Moreover, according to the second embodiment, the wireless communication device 101 includes a third antenna 1001 and a third communication module 1002. At this point, the third communication module 1002, for example, is coupled to the third antenna 1001, and according to an instruction of the control module 201, processes a signal that is transmitted and received through the third antenna 1001. The third antenna 1001, for example, is an antenna through which communication with a third base station is performed in a third frequency band (for example, a 1.5 GHz band).

Then, according to the second embodiment, the wireless communication device 101 is assumed to receive data from the second base station 112 using the second frequency band, or receive data from the third base station using the third frequency band while transmitting and receiving the data in the first frequency band. According to the second embodiment, for example, a level of a spurious of a waveform of a transmission signal 401 in the first frequency band from the first antenna 121 is assumed to be high in the downlink bands of the second frequency band and of the third frequency band for communication. That is, according to the second embodiment, the antenna through which communication is performed in the frequency band in which the spurious of the transmission wave that is output from the antenna causes the frequency interference to occur in communication through another antenna which is included in the wireless communication device 101 is described below as referring to as the first antenna 121. The second antenna 122 and the third antenna 1001 are referred to as an antenna through which communication is performed in the frequency band in which the frequency interference occurs because the spurious of the transmission wave that is output from the first antenna 121 is superimposed onto the reception band.

In this case, the wireless communication device 101, as illustrated in FIG. 10, includes the switch module 230 according to the second embodiment just below the first antenna 121. In FIG. 10, the switch module 230 includes two series resonance circuits, that is, a first series resonance circuit 1003 and a second series resonance circuit 1004, as the signal removal circuit 500 that is selectively connectable using the switch SW2. The first series resonance circuit 1003, for example, includes a coil (L) and a capacitor (C1) that are coupled in series to each other. The first series resonance circuit 1003 has a resonance frequency in the vicinity of the reception band of the second frequency band for the communication through the second antenna 122. The second series resonance circuit 1004, for example includes a coil (L) and a capacitor (C2) that are coupled in series to each other. The second series resonance circuit 1004 has a resonance frequency in the vicinity of the reception band of the third frequency band for the communication through the third antenna 1001.

Then, in a case where data is received from the second base station 112 in the second frequency band, using the second antenna 122 while data is transmitted and received to and from the first base station 111 in the first frequency band, the control module 201, for example, switches the switch SW2 and thus connects the switch SW2 to the capacitor C1. Accordingly, in the output that is transmitted from the first antenna 121, the frequency component in the vicinity of the reception band of the second frequency band for communication flows to the ground, and thus is filtered out. For this reason, the spurious of the transmission signal from the first antenna 121 can be suppressed from influencing the communication through the second antenna 122.

In a case where data is received from the third base station in the third frequency band, using the third antenna 1001 while data is transmitted and received to and from the first base station 111 in the first frequency band, the control module 201, for example, switches the switch SW2, and thus connects the switch SW2 to the capacitor C2. Accordingly, in the output that is transmitted from the first antenna, the frequency component in the vicinity of the reception band of the third frequency band for communication flows to the ground, and thus is filtered out. For this reason, the spurious of the transmission signal from the first antenna 121 can be suppressed from influencing the communication through the third antenna 1001.

According to the second embodiment, the control module 201, for example, also controls the connection of the signal removal circuit 500, based on whether or not the CA is performed, the output strength of the transmission signal from the first antenna 121, the C/N ratio of the signal that is received through another antenna, and the like. In a case where the CA is not used for communication, for example, the control module 201 may switch the switch SW2 to OPEN (establishes a connection to OPEN in FIG. 10) and thus may not connect the series resonance circuit to the first antenna 121.

In a case where the CA is used for communication, the control module 201, for example, controls the connection of the series resonance circuit to the first antenna 121, based on the output strength of the transmission signal from the first antenna 121. For example, if the power of the transmission signal from the first antenna 121, which is amplified by the power amplifier that is included in the first communication module 221, is equal to or smaller than the first value, the control module 201 may not connect the series resonance circuit to the first antenna 121. On the other hand, if the power of the transmission signal from the first antenna 121 is greater than the first value, the control module 201 connects the series resonance circuit that has the resonance frequency in the downlink band for the communication through another antenna, which is performed at the same time that the communication through the first antenna 121 is performed, to the first antenna 121.

Moreover, although the power of the transmission signal from the first antenna 121 is greater than the first value, in a case where the C/N ratio of the reception signal can be secured sufficiently in the communication through another antenna, which is performed at the same time, the control module 201 connects the switch SW2 to OPEN.

Figure 11A:
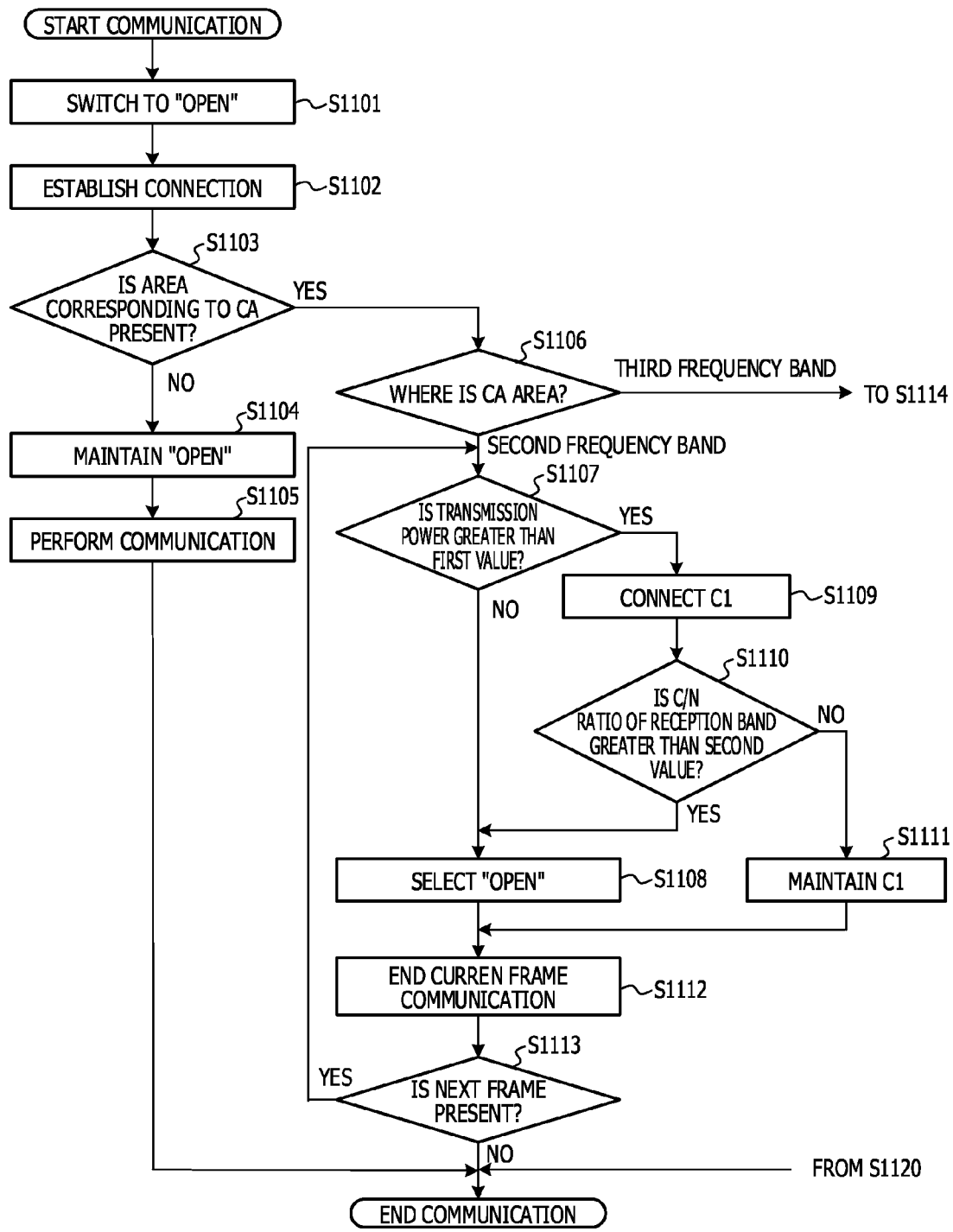
FIGS. 11A and 11B are flowcharts illustrating one example of processing that controls the switch module according to the second embodiment.
Figure 11B:
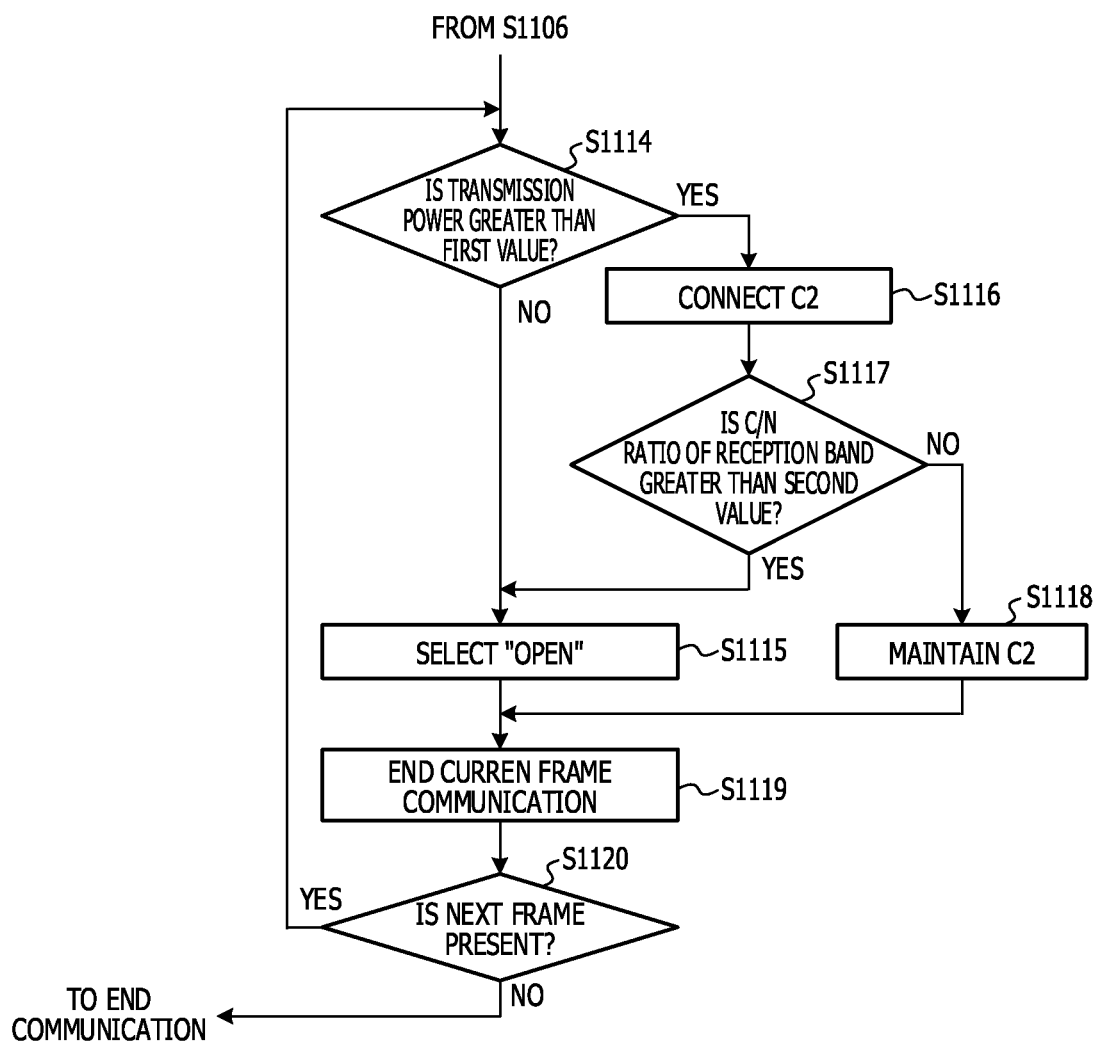

FIGS. 11A and 11B are flowcharts illustrating one example of processing that controls the switch module 230 according to the second embodiment, which is performed by the control module 201 of the wireless communication device 101. According to one embodiment, when a communication starting instruction is input into the control module 201 of the wireless communication device 101, the control module 201 starts to perform the process that controls the switch module 230 according to the second embodiment, which is illustrated in FIGS. 11A and 11B.

First, as illustrated in FIG. 11A, the control module 201 of the wireless communication device 101 switches the switch SW2 to OPEN and causes the SW2 to be in an initial state (S1101). In a case where the switch SW2 is already switched to OPEN, the control module 201 maintains a state in which the switch SW2 is opened. Subsequently, the control module 201 establishes the connection to the base station 110 (S1102). At this point, as one example, the control module 201 is assumed to connect to the first base station 111 in the first frequency band, using the first antenna 121. Subsequently, the control module 201 determines whether or not the communication area in which the wireless communication device 101 is present is the area that corresponds to the carrier aggregation (CA) (S1103). For example, based on the information that is received from the first base station 111, the connection to which is established, the control module 201 determines whether or not the communication area in which the wireless communication device 101 is present is the area that corresponds to the CA. In the case where it is determined that the communication area in which the wireless communication device 101 is present is not the area that corresponds to the CA (No in S1103), the control module 201 maintains the state where the switch SW2 is opened (S1104). Subsequently, the control module 201 performs communication with the first base station 111, the connection to which is established in S1102, in the first frequency band, using the first antenna 121 (S1105). When the transmission and reception of data is finished, the present operational flow is ended.

On the other hand, in the case where it is determined in S1103 that the communication area in which the wireless communication device 101 is present is the area that corresponds to the CA (Yes in S1103), the control module 201 selects the frequency band in which communication is performed using the carrier aggregation at the same time that the communication with the first base station 111, the communication with which is established in S1102, is performed in the first frequency band (S1106). For example, according to an instruction from the first base station 111, the connection to which is established in S1102, the control module 201 selects the frequency band, using the CA. In S1106, in a case where the second frequency band is used as a frequency band in which communication is performed at the same time that the communication is performed in the first frequency band (in a case where the second frequency band is selected in S1106), the control module 201 has a connection to the second base station 112 that performs the communication in the second frequency band, and the flow proceeds to S1107. In this case, the control module 201, for example, performs processing that is different from that in the present operational flow, and thus performs the communication with the second base station 112, the connection to which is established, using the carrier aggregation. For example, the control module 201 receives data from the second base station 112 through the second antenna 122.

In S1107, the control module 201 sets the power of the transmission signal in the communication with the first base station 111, the connection to which is established in S1102, through the first antenna 121. Then, the control module 201 determines whether or not the output of the transmission signal that is set is greater than the first value. This determination, for example, is performed at the same time that the determination is performed in S807 according to the first embodiment. In a case where it is determined in S1107 that the power of the transmission signal is equal to or smaller than the first value (No in S1107), the control module 201 switches the switch SW2 to OPEN (S1108). In S1108, in a case where the switch SW2 is already switched to OPEN, the control module 201 maintains a state in which the switch SW2 is opened.

On the other hand, in a case where it is determined in S1107 that the power of the transmission signal is greater than the first value (Yes in S1107), the control module 201 switches the switch SW2, and thus connects the switch SW2 to the capacitor C1 (S1109). In S1109, the control module 201 connects the first series resonance circuit 1003 that has the resonance frequency in the reception band of the second frequency band for the communication that is performed using the second antenna 122, to the first antenna 121. In a case where in S1109, the switch SW2 is already coupled to the capacitor C1, the control module 201 maintains a state where the switch SW2 is coupled.

Subsequent to S1109, the control module 201 monitors the carrier-to-noise ratio of the reception signal through the second antenna 122 through which the communication is performed in the second frequency band that is selected in S1106. Then, the control module 201 determines whether or not the carrier-to-noise ratio is greater than the second value (S1110). The second value is set in such a manner that it can be determined whether or not the reception signal whose communication is performed in another frequency band through another antenna at the same time that the communication is performed in the first frequency band through the first antenna 121 can be received at a level that does not cause an obstacle to the communication. The second value, for example, is set according to a modulation scheme or a coding rate. According to one embodiment, the second value is a value ranging from 20 dB to 30 dB.

In a case where it is determined in S1110 that the carrier-to-noise ratio of the reception signal through the second antenna 122 is greater than the second value (Yes in S1110), the control module 201 switches the switch SW2 to OPEN (S1108). In a case where it is determined in S1110 that the carrier-to-noise ratio of the reception signal from the second antenna is equal to or smaller than the second value (No in S1110), the control module 201 maintains a state where the switch SW2 is coupled to the capacitor C1 (S1111). The control module 201 maintains a state where the first series resonance circuit 1003 that has the resonance frequency in the reception band of the second frequency band for the communication through the second antenna 122 is coupled to the first antenna 121. Therefore, the frequency component in the vicinity of the reception frequency band in the second antenna 122, which is included in the transmission signal from the first antenna 121 flows to the ground through the first series resonance circuit 1003, and thus is filtered out. For this reason, the spurious of the transmission signal from the first antenna 121 can be suppressed from influencing the communication through the second antenna 122. Then, the improvement in the carrier-to-noise ratio of the reception signal through the second antenna 122 can be expected.

In S1112, the control module 201 performs communication until the transmission and reception of data in a frame that is currently allocated to the communication with the first base station 111 that uses the first antenna 121 is finished. Subsequently, the control module 201 determines whether the next frame is present (S1113). In the case where it is determined that the next frame is present (Yes in S1113), the flow returns to S1107. On the other hand, in the case where it is determined that the next frame is not present (No in S1113), the control module 201 ends the present operational flow by ending the communication.

In S1106, in a case where the third frequency band is used as a frequency band in which communication is performed at the same time that the communication is performed in the first frequency band (in a case where the third frequency band is selected in S1106), the control module 201 has a connection to the third base station that performs the communication in the third frequency band, and the flow proceeds to S1114 illustrated in FIG. 11B. In this case, the control module 201, for example, performs processing that is different from that in the present operational flow, and thus performs communication with the third base station, the connection to which is established, using the carrier aggregation. For example, the control module 201 receives data from the third base station through the third antenna 1001.

Subsequently, processing operations in S1114 to S1120 correspond to the processing operations that are described referring to S1107 to S1113, respectively. For example, the control module 201 performs the processing operations in S1114 to S1120 that are the same processing operations as described referring to S1107 to S1113. However, the processing operations in S1114 to S1120 are processing operations that are performed in a case where the third frequency band is used as a frequency band in which communication is performed at the same time that communication is performed in the first frequency band. For this reason, in S1116, the control module 201 connects the switch SW2 to the capacitor C2. Then, the control module 201 connects the second series resonance circuit 1004 that has the resonance frequency in the reception band of the third frequency band for the communication that is performed using the third antenna 1001, to the first antenna 121.

In S1117, the control module 201 monitors the carrier-to-noise ratio of the reception signal through the third antenna 1001 through which the communication is performed in the third frequency band that is selected in S1106. Then, the control module 201 determines whether or not the acquired carrier-to-noise ratio is greater than the second value. In S1118, the control module 201 maintains a state where the switch SW2 is coupled to the capacitor C2. The control module 201 maintains the state where the second series resonance circuit 1004 that has the resonance frequency in the reception band of the third frequency band for the communication that is performed using the third antenna 1001 is coupled to the first antenna 121. In an example in FIGS. 11A and 11B, the first value is used for the determination in each of S1107 and S1114. However, different values may be set as the first values that are used for the determinations in S1107 and S1114. In the same manner, the second value is used for the determination in each of S1110 and S1117, but different values may be as the second values that are used for the determinations in S1110 and S1117.

As described above, according to the second embodiment, the wireless communication device 101 has the first series resonance circuit 1003 and the second series resonance circuit 1004 that are selectively connectable to the first antenna 121, as the signal removal circuit 500. At this point, the resonance frequency of the first series resonance circuit 1003 is combined with the reception band of the second frequency band for the communication through the second antenna 122. The resonance frequency of the second series resonance circuit 1004 is combined with the reception band of the third frequency band for the communication through the third antenna 1001. Then, the control module 201, for example, is assumed to perform the reception using the second frequency band in the second antenna 122 while performing the communication through the first antenna 121 in the CA. In this case, based on the strength of the transmission output of the first antenna 121, the control module 201 connects the first series resonance circuit 1003 to the first antenna 121. Therefore, the spurious of the transmission signal from the first antenna 121 can be suppressed from influencing the communication through the second antenna 122. Then, for example, the improvement in the carrier-to-noise ratio of the reception signal through the second antenna 122 can be expected. For example, the control module 201 is assumed to perform the reception using the third frequency band in the third antenna 1001 while performing the communication through the first antenna 121 in the CA. In this case, based on the transmission output of the first antenna 121, the control module 201 connects the second series resonance circuit 1004 to the first antenna 121. Therefore, the spurious of the transmission signal from the first antenna 121 can be suppressed from influencing the communication through the third antenna 1001. Therefore, the improvement in the carrier-to-noise ratio of the reception signal through the third antenna 1001 can be expected. On the other hand, in a case where the first series resonance circuit 1003 is coupled to the first antenna 121, based on the carrier-to-noise ratio of the reception signal through the second antenna 122, the control module 201 releases the connection of the first series resonance circuit 1003 to the first antenna 121. In a case where the second series resonance circuit 1004 is coupled to the first antenna 121, based on the carrier-to-noise ratio of the receive signal through the third antenna 1001, the control module 201 releases the connection of the second series resonance circuit 1004 to the first antenna 121. For this reason, the loss of the transmission signal due to the connection of the first series resonance circuit 1003 or of the second series resonance circuit 1004 does not occur and thus the signal can be transmitted efficiently.

Therefore, according to the second embodiment, even in a case where the wireless communication device 101 performs communication using multiple bands among three or more frequency bands, at the same time, the signal removal circuit 500 that removes the component of the reception frequency band for the communication in the selected band from the transmission signal is coupled to an antenna. For this reason, according to the second embodiment, in addition to the effect that is achieved according to the first embodiment, the frequency interference between antennas, which results from the frequency band that is used in simultaneous communication, can be reduced even in the case where the wireless communication device 101 perform the simultaneous communication in multiple frequency bands among three or more frequency bands.

Several embodiments are described above as examples, but the embodiment is not limited to these. For example, the operational flow that is described above referring to FIGS. 8, 11A and 11B is an example, and the embodiment is not limited to this. For example, if possible, the order in which the processing operations are performed may be changed in the operational flow, and the operational flow may include further processing separately. Alternately, one or several processing operations in the operational flow may be omitted.

For example, according to the first and second embodiments, in a case where the transmission power is greater than the first value, the signal removal circuit 500 is coupled to the first antenna 121 (S809, S1109, and S1116). For example, in a case where the transmission power of the first antenna 121 is greater than the first value, there is a high likelihood that the frequency interference will be caused to occur in the communication through another antenna 120 that is included in the wireless communication device 101. For this reason, when the processing operations are performed in a manner as described above, a satisfactory communication environment can be secured rapidly. However, the embodiment is not limited to this. According to another embodiment, the processing operations in S809, S1109, and S1116 may not be performed. Then, for example, in a case where it is determined in S810, S1110, and S1117 that the answer is No, the control module 201 may connect the signal removal circuit 500 to the first antenna 121 in S811, S1111, and S1118.

According to the first and second embodiments, an example is described in which a 2.0 GHz band, an 800 MHz band, and a 1.5 GHz band are used as the first frequency band, the second frequency band, and the third frequency band, respectively. However, the embodiment is not limited to this. The first to third frequency bands may be frequency bands other than the 2.0 GHz band, the 800 MHz band, and the 1.5 GHz band, respectively. Referring to FIG. 4, an example is described in which the downlink band: RX band that makes up the pair is arranged further to the high frequency side than the uplink band: TX band. However, the embodiment is not limited to this. The downlink band: RX band that makes up the pair may be arranged further to the low frequency side than the uplink band: TX band. In this case, for example, when a high pass filter type circuit is provided to the transmitting side of the duplexer and attenuation in the downlink band: RX band that makes up the pair and that is on the low frequency side is achieved, attenuation of the spurious on the high frequency signal side of the TX band is insufficient. Then, in this case, for example, the transmission wave in an 800 MHz band for communication can cause the interference to occur in the reception band of 2.0 GHz that is positioned closer to the high frequency side. For example, in this case, the signal removal circuit 500 that removes a component of the reception band of a 2.0 GHz band for communication may be coupled to the antenna 120 that is used for communication in an 800 MHz band, and thus the embodiment may apply. In this manner, for example, a suitable modification to the embodiment may be made according to the arrangement of multiple frequency bands that are used for simultaneous communication and a level of the spurious.

Moreover, according to the first and second embodiments, an example is described in which the first antenna 121 includes the switch module 230. However, the embodiment is not limited to this, the switch module 230 may be included in the multiple antennas 120 that are included in the wireless communication device 101. For example, the signal removal circuit 500 that removes a component of the reception band for the communication through the first antenna 121 from the transmission signal may be included in the second antenna 122 and the third antenna 1001 which are included in the wireless communication device 101, and thus the embodiment described above may apply.

According to the embodiment, a case where the carrier aggregation is used is described above as an example of a situation where the wireless communication device 101 performs communication in multiple frequency bands at the same time. However, the embodiment is not limited to this. For example, the embodiment can also apply to another situation where the wireless communication device 101 performs communication multiple frequency bands at the same time. As one example, in a case where data communication is performed in LTE while performing voice data communication in GSM (a registered trademark), the signal removal circuit 500 that removes a component of the reception band of the voice data in GSM (a registered trademark) from a transmission signal may be included in the antennas 120 for communication in LTE, and thus the embodiment may apply. GSM (a registered trademark) is short for global system for mobile communications. LTE is short for Long Term Evolution.

It is apparent to a person of ordinary skill in the art that several embodiments including the embodiments described above include various modification and substitution examples of the embodiments described above. For example, each embodiment may be realized by making a change to a constituent element thereof. Various embodiments may be implemented by suitably combining multiple constituent elements that are described above for disclosure according to the embodiment. Moreover, various embodiments may be implemented by deleting one or several constituent elements from all constituent elements that are described according to the embodiment or substituting for one or several constituents, or by adding one or several constituent elements to the constituent elements that are described according to the embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication device comprising:
    a first antenna from which a first signal is transmitted;
    a second antenna through which a second signal is received in a frequency band that is different from a frequency band of the first signal;
    a first signal removal circuit configured to remove a component of a frequency band of the second signal from the first signal when the first signal removal circuit is electrically coupled to the first antenna; and
    a processor configured to determine whether to electrically connect the first signal removal circuit to the first antenna, based on an output strength of the first signal that is transmitted from the first antenna, when the second signal is received through the second antenna,
    wherein the first signal removal circuit is a series resonance circuit that has a resonance frequency within the frequency band of the second signal, and one end of the series resonance circuit is grounded.

2. The wireless communication device according to claim 1,
    wherein the processor is configured to cause the first signal removal circuit to remove the component of the frequency band of the second signal, which is included in a spurious of the first signal, by electrically connecting the first signal removal circuit to the first antenna.

3. The wireless communication device according to claim 1,
    wherein the processor is configured to electrically connect the first signal removal circuit to the first antenna, when the output strength of the first signal that is transmitted from the first antenna is greater than a first value.

4. The wireless communication device according to claim 3,
    wherein the processor is configured to determine whether a carrier-to-noise ratio of the second signal that is received through the second antenna is greater than a second value, after electrically connecting the first signal removal circuit to the first antenna,
    wherein the processor is configured to release the electrical connection between the first signal removal circuit and the first antenna, when it is determined that the carrier-to-noise ratio of the second signal is greater than the second value, and
    wherein the processor is configured to maintain the electrical connection between the first signal removal circuit and the first antenna, when it is not determined that the carrier-to-noise ratio of the second signal is greater than the second value.

5. The wireless communication device according to claim 1, further comprising:
    a switch configured to control the electrical connection between the first signal removal circuit and the first antenna according to a control signal that is transmitted from the processor.

6. The wireless communication device according to claim 1,
    wherein the first signal removal circuit is a filter circuit that allows a specific frequency component to pass through.

7. The wireless communication device according to claim 1, further comprising:
    a third antenna through which a third signal is received in a frequency band that is different from the frequency bands of the first signal and of the second signal, and
    a second signal removal circuit configured to remove a component of a frequency band of the third signal from the first signal, when the second signal removal circuit is electrically coupled to the first antenna,
    wherein, in a case where the third signal is received through the third antenna, when an output strength of the first signal that is transmitted from the first antenna is greater than the first value, the processor is configured to electrically connect the second signal removal circuit to the first antenna.

8. A wireless communication method executed by a processor which is included in a wireless communication device that includes a first antenna from which a first signal is transmitted, and a second antenna through which a second antenna is received in a frequency band that is different from a frequency band of the first signal, the wireless communication method comprising:
    acquiring an output strength of the first signal that is transmitted from the first antenna which is included in the wireless communication device, when the second signal is received through the second antenna, and
    determining whether to electrically connect a signal removal circuit that removes a component of a frequency band of the second signal from the first signal to the first antenna, based on the output strength of the first signal,
    wherein the signal removal circuit is a series resonance circuit that has a resonance frequency within the frequency band of the second signal, and one end of the series resonance circuit is grounded.

9. The wireless communication method according to claim 8, further comprising:
    causing the signal removal circuit to remove the component of the frequency band of the second signal, which is included in a spurious of the first signal, by electrically connecting the first signal removal circuit to the first antenna.

10. The wireless communication method according to claim 8,
    wherein the causing includes electrically connecting the signal removal circuit to the first antenna, when the output strength of the first signal that is transmitted from the first antenna is greater than a first value.

11. The wireless communication method according to claim 10, further comprising:
    determining whether a carrier-to-noise ratio of the second signal that is received through the second antenna is greater than a second value, after electrically connecting the first signal removal circuit to the first antenna,
    releasing the electrical connection between the signal removal circuit and the first antenna, when it is determined that the carrier-to-noise ratio of the second signal is greater than the second value, and
    maintaining the electrical connection between the signal removal circuit and the first antenna, when it is not determined that the carrier-to-noise ratio of the second signal is greater than the second value.

12. A non-transitory computer-readable recording medium that causes a processor of a wireless communication device to execute a process, the wireless communication device including a first antenna from which a first signal is transmitted and a second antenna through which a second signal is received in a frequency band that is different a frequency band of the first signal, the process comprising:
    acquiring an output strength of the first signal that is transmitted from the first antenna which is included in the wireless communication device, when the second signal is received through the second antenna; and
    determining whether to electrically connect a signal removal circuit that removes a component of a frequency band of the second signal from the first signal to the first antenna, based on the output strength of the first signal,
    wherein the signal removal circuit is a series resonance circuit that has a resonance frequency within the frequency band of the second signal, and one end of the series resonance circuit is grounded.

13. The non-transitory computer-readable recording medium according to claim 12, further comprising:
    causing the signal removal circuit to remove the component of the frequency band of the second signal, which is included in a spurious of the first signal, by electrically connecting the signal removal circuit to the first antenna.

14. The non-transitory computer-readable recording medium according to claim 12,
    wherein the causing includes electrically connecting the signal removal circuit to the first antenna, when the output strength of the first signal that is transmitted from the first antenna is greater than a first value.

15. The non-transitory computer-readable recording medium according to claim 14, further comprising:
    determining whether a carrier-to-noise ratio of the second signal that is received through the second antenna is greater than a second value, after electrically connecting the signal removal circuit to the first antenna,
    releasing the electrical connection between the signal removal circuit and the first antenna, when it is determined that the carrier-to-noise ratio of the second signal is greater than the second value, and
    maintaining the electrical connection between the signal removal circuit and the first antenna, when it is not determined that the carrier-to-noise ratio of the second signal is greater than the second value.

* * * * *